US006928390B2

(12) United States Patent
Shen

(10) Patent No.: US 6,928,390 B2
(45) Date of Patent: Aug. 9, 2005

(54) METHOD OF NONLINEAR CALIBRATION OF HALFTONE SCREEN

(75) Inventor: Ling-Chu Shen, Taipei (TW)

(73) Assignee: Destiny Technology Corporation, Taipei (TW)

(*) Notice: Subject to any disclaimer, the term of this patent is extended or adjusted under 35 U.S.C. 154(b) by 50 days.

(21) Appl. No.: 10/668,232

(22) Filed: Sep. 24, 2003

(65) Prior Publication Data

US 2005/0075813 A1 Apr. 7, 2005

(51) Int. Cl.⁷ .............................................. G01D 18/00
(52) U.S. Cl. ...................................................... 702/182
(58) Field of Search ........................ 702/182; 358/1.13, 358/1–9, 3.07, 534, 3, 1.3–1.9, 504, 527, 535–356; 101/484; 382/163, 162; 395/101, 461, 536

(56) References Cited

U.S. PATENT DOCUMENTS 5,841,897 A * 11/1998 Numakura et al. ......... 382/163
5,953,498 A    9/1999 Samworth .................. 395/109

* cited by examiner

Primary Examiner—Michael Nghiem
Assistant Examiner—Tung Lau
(74) Attorney, Agent, or Firm—Harness, Dickey & Pierce, PLC

(57) ABSTRACT

Calibration could be implemented in several stages during the color rendering processes. One possible and efficient place to put the calibration to work is in the screen table itself. In order to make the screen intelligent enough to adjust the factor results from output device characteristics, such as the dot gain, toner characteristics, etc., the method is introduced to create a gamma function with normalized gradation curve. Some color balance adjustment features (contrast, brightness, saturation and color strength) also have been taken into consideration.

3 Claims, 19 Drawing Sheets

| 0 | 16 | 216 | 224 | 232 | 168 | 48 | 31 | 2 | 18 | 218 | 226 | 234 | 170 | 50 | 29 |
|---|---|---|---|---|---|---|---|---|---|---|---|---|---|---|---|
| 13 | 120 | 128 | 160 | 192 | 136 | 111 | 87 | 15 | 122 | 130 | 162 | 194 | 138 | 109 | 85 |
| 181 | 149 | 96 | 56 | 64 | 119 | 159 | 215 | 183 | 151 | 98 | 58 | 66 | 117 | 157 | 213 |
| 245 | 205 | 77 | 40 | 39 | 95 | 191 | 255 | 247 | 207 | 79 | 42 | 37 | 93 | 189 | 253 |
| 237 | 173 | 53 | 27 | 7 | 23 | 223 | 231 | 239 | 175 | 55 | 25 | 5 | 21 | 221 | 229 |
| 197 | 141 | 107 | 83 | 11 | 127 | 135 | 167 | 199 | 143 | 105 | 81 | 9 | 125 | 133 | 165 |
| 69 | 115 | 155 | 211 | 179 | 147 | 103 | 63 | 71 | 113 | 153 | 209 | 177 | 145 | 101 | 61 |
| 35 | 91 | 187 | 251 | 243 | 203 | 75 | 47 | 33 | 89 | 185 | 249 | 241 | 201 | 73 | 45 |
| 3 | 19 | 219 | 227 | 235 | 171 | 51 | 28 | 1 | 17 | 217 | 225 | 233 | 169 | 49 | 30 |
| 14 | 123 | 131 | 163 | 195 | 139 | 108 | 84 | 12 | 121 | 129 | 161 | 193 | 137 | 110 | 86 |
| 182 | 150 | 99 | 59 | 67 | 116 | 156 | 212 | 180 | 148 | 97 | 57 | 65 | 118 | 158 | 214 |
| 246 | 206 | 78 | 43 | 36 | 92 | 188 | 252 | 244 | 204 | 76 | 41 | 38 | 94 | 190 | 254 |
| 238 | 174 | 54 | 24 | 4 | 20 | 220 | 228 | 236 | 172 | 52 | 26 | 6 | 22 | 222 | 230 |
| 198 | 142 | 104 | 80 | 8 | 124 | 132 | 164 | 196 | 140 | 106 | 82 | 10 | 126 | 134 | 166 |
| 70 | 112 | 152 | 208 | 176 | 144 | 100 | 60 | 68 | 114 | 154 | 210 | 178 | 146 | 102 | 62 |
| 32 | 88 | 184 | 248 | 240 | 200 | 72 | 44 | 34 | 90 | 186 | 250 | 242 | 202 | 74 | 46 |

| 0 | 0 | 191 | 249 | 249 | 210 | 59 | 19 | 0 | 0 | 192 | 249 | 249 | 211 | 60 | 16 |
|---|---|---|---|---|---|---|---|---|---|---|---|---|---|---|---|
| 0 | 119 | 153 | 219 | 181 | 144 | 113 | 85 | 1 | 122 | 154 | 221 | 183 | 145 | 109 | 81 |
| 232 | 128 | 91 | 68 | 40 | 104 | 160 | 198 | 236 | 132 | 94 | 70 | 42 | 100 | 157 | 194 |
| 242 | 166 | 44 | 25 | 10 | 75 | 227 | 249 | 246 | 170 | 47 | 29 | 7 | 72 | 223 | 249 |
| 249 | 204 | 53 | 24 | 0 | 0 | 189 | 249 | 249 | 208 | 57 | 21 | 0 | 0 | 185 | 249 |
| 176 | 138 | 118 | 89 | 6 | 127 | 151 | 217 | 179 | 141 | 114 | 86 | 2 | 124 | 147 | 213 |
| 35 | 108 | 165 | 203 | 241 | 137 | 99 | 66 | 38 | 105 | 161 | 199 | 237 | 133 | 95 | 63 |
| 15 | 80 | 231 | 249 | 249 | 174 | 52 | 33 | 11 | 77 | 228 | 249 | 247 | 171 | 49 | 30 |
| 0 | 0 | 193 | 249 | 249 | 212 | 61 | 17 | 0 | 0 | 190 | 249 | 249 | 209 | 58 | 18 |
| 0 | 121 | 155 | 222 | 184 | 146 | 111 | 82 | 0 | 120 | 152 | 218 | 180 | 142 | 112 | 84 |
| 235 | 131 | 93 | 71 | 43 | 101 | 158 | 196 | 234 | 129 | 92 | 67 | 39 | 102 | 159 | 197 |
| 244 | 168 | 46 | 28 | 8 | 73 | 224 | 249 | 243 | 167 | 45 | 26 | 9 | 74 | 225 | 249 |
| 249 | 206 | 56 | 22 | 0 | 0 | 186 | 249 | 249 | 205 | 54 | 23 | 0 | 0 | 187 | 249 |
| 178 | 140 | 115 | 87 | 3 | 125 | 148 | 215 | 177 | 139 | 117 | 88 | 4 | 126 | 150 | 216 |
| 37 | 106 | 163 | 200 | 238 | 134 | 97 | 64 | 36 | 107 | 164 | 202 | 240 | 135 | 98 | 65 |
| 13 | 78 | 229 | 249 | 248 | 172 | 50 | 31 | 14 | 79 | 230 | 249 | 249 | 173 | 51 | 32 |

| 0 | 169 | 245 | 235 | 188 | 37 | 0 | 0 | 0 | 170 | 246 | 237 | 189 | 38 | 0 |
|---|---|---|---|---|---|---|---|---|---|---|---|---|---|---|
| 0 | 131 | 197 | 159 | 122 | 91 | 63 | 0 | 100 | 132 | 199 | 161 | 123 | 87 | 59 |
| 210 | 69 | 46 | 18 | 82 | 138 | 176 | 214 | 110 | 72 | 48 | 20 | 78 | 135 | 172 |
| 220 | 22 | 3 | 0 | 53 | 205 | 249 | 224 | 148 | 25 | 7 | 0 | 50 | 201 | 249 |
| 229 | 31 | 2 | 0 | 0 | 167 | 243 | 233 | 186 | 35 | 0 | 0 | 0 | 163 | 239 |
| 154 | 96 | 67 | 0 | 105 | 129 | 195 | 157 | 119 | 92 | 64 | 0 | 102 | 125 | 191 |
| 13 | 86 | 143 | 219 | 115 | 77 | 44 | 16 | 83 | 139 | 177 | 215 | 111 | 73 | 41 |
| 0 | 58 | 209 | 228 | 152 | 30 | 11 | 0 | 55 | 206 | 249 | 225 | 149 | 27 | 8 |
| 0 | 0 | 247 | 238 | 190 | 39 | 0 | 0 | 0 | 168 | 244 | 234 | 187 | 36 | 0 |
| 0 | 99 | 200 | 162 | 124 | 89 | 60 | 0 | 98 | 130 | 196 | 158 | 120 | 90 | 62 |
| 213 | 109 | 49 | 21 | 79 | 136 | 174 | 212 | 107 | 70 | 45 | 17 | 80 | 137 | 175 |
| 222 | 146 | 6 | 0 | 51 | 202 | 249 | 221 | 145 | 23 | 4 | 0 | 52 | 203 | 249 |
| 232 | 184 | 0 | 0 | 0 | 164 | 240 | 231 | 183 | 32 | 1 | 0 | 0 | 165 | 241 |
| 156 | 118 | 65 | 0 | 103 | 126 | 193 | 155 | 117 | 95 | 66 | 0 | 104 | 128 | 194 |
| 15 | 84 | 178 | 216 | 112 | 75 | 42 | 14 | 85 | 142 | 180 | 218 | 113 | 76 | 43 |
| 0 | 56 | 207 | 226 | 150 | 28 | 9 | 0 | 57 | 208 | 249 | 227 | 151 | 29 | 10 |

Fig. 19

METHOD OF NONLINEAR CALIBRATION OF HALFTONE SCREEN

BACKGROUND OF THE INVENTION

1. Field of Invention

The invention relates to the method for printing apparatus halftone screen calibration. More specifically the invention is used in the halftone screen creation process.

2. Related Art

While printing, the printer usually needs to perform the color conversion from RGB to CMYK color space. Typically, the 3-bytes RGB electronic data are converted to 4-bytes CMYK data, wherein R, G, B, C, M, Y and K are respectively represented by one byte with a value between 0–255. During color rendering process, the CMYK values of the original image are compared with the corresponding values in the screen table to determine whether each dot has to be "printed".

Figure 1:
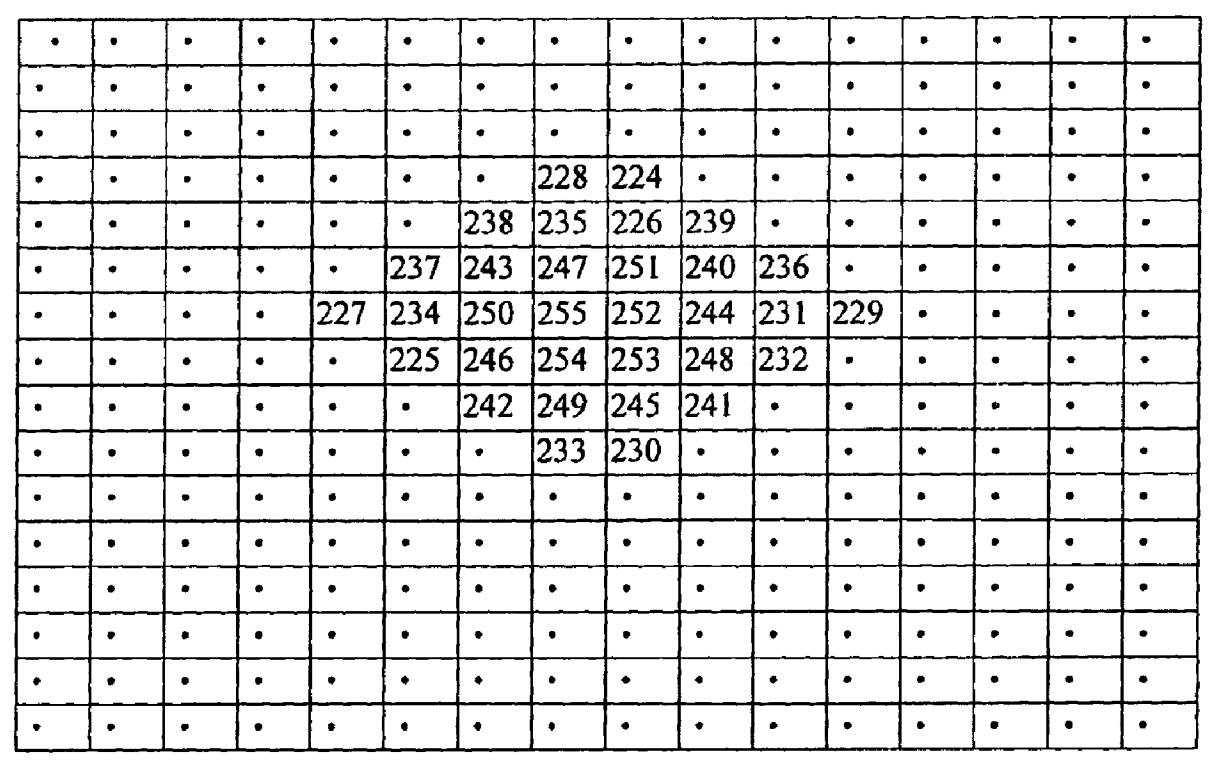

FIG. 1 is a schematic view illustrating a halftone screen table. It is formed of a 16×16 matrix having 256 grid units for filling 0–255 gray levels (although the figure only shows values of 255–224, the values of other grid units may be readily inferred). The gray level in each grid unit of the screen table represents a reference value that will be compared with the raw data to determine whether the corresponding dot should be printed.

How to print the dot depending on the settings of the command program (such as PCL, PS3, etc.). For example, when the raw data is greater (smaller) than the value of the screen table, then a dot will be printed.

Figure 2:
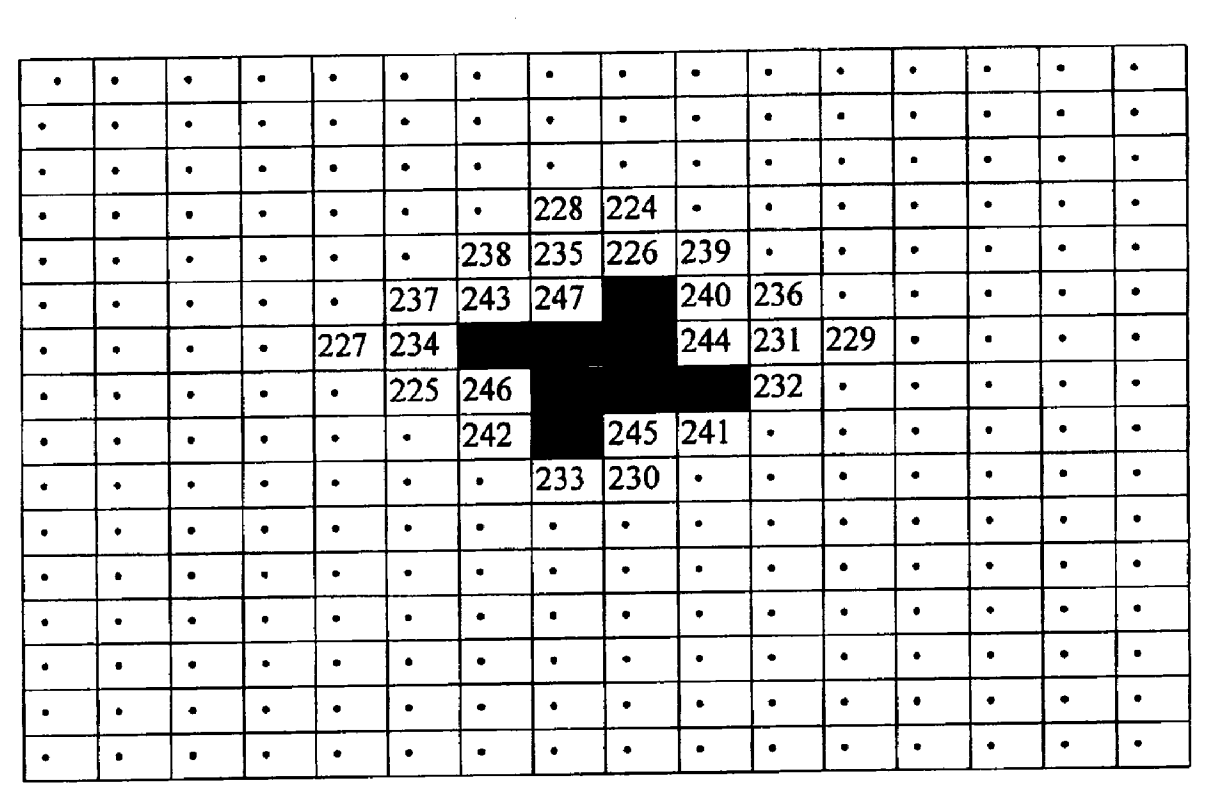

FIG. 2 depicts a case where dot will be printed when the value of the screen table is greater than the raw data. Suppose we want to print a square area with gray level 247. By comparing the screen table (FIG. 1) with 247, we can get the dots printed like FIG. 2.

In addition to monochrome printing, a color printing system can apply the same concept to adjust CMYK screen tables respectively.

Each printing apparatus may have different characteristics. Therefore the halftone screen generated for one apparatus may behave differently due to those characteristics, such as dot gain, toner characteristic, etc. A screen calibration consequently is used to perform on each model of printer engine to obtain an optimal image/data output.

U.S. Pat. No. 5,953,498 discloses a nonlinear calibration of output devices to solve the problems relating to image color intensity. In its calibration method, 8-bit gray level data of the image are converted to 16-bit gray level data in which compensation information, used to perform data calibration, is further added. However, this calibration method usually needs the installation of a permanent program or in other cases the installation of additional equipment, which is burdensome and practically inconvenient.

SUMMARY OF THE INVENTION

During color rendering processes, in order to ensure the best color quality, calibration could be implemented in several stages. One possible and efficient place to put the calibration to work is in the screen table itself. In order to make the screen table intelligent enough to adjust the factors result from output device characteristics, such as the dot gain, toner characteristics, etc., the following method is introduced to create a screen table with normalized gradation curve. Some color balance adjustment features also have been taken into consideration.

The invention intends to provide a method of nonlinear calibration that can be used in different type printing apparatus to adjust the unavoidable engine characteristics.

According to an embodiment of the invention, the nonlinear calibration method is implemented on a cluster-dot-order (AM) halftone screen table. As shown in FIG. 3 is a schematic view illustrating a FM screen growth order. Method addressing how to create the original screen table is disclosed in, e.g. Holladay algorithm. This method is therefore free of the texture problem.

When a 256-gray levels halftone screen table is used for data rendering, the input image raw data are compared with the value of the halftone screen table to determine if the corresponding dot is to be printed. For example, if the value of the halftone screen table is greater than the raw data, dot will be printed.

For different printing apparatus, the invention uses the same nonlinear gamma functions with different function parameters to adjust the gray levels. The different parameter values of the gamma function are adjusted according to the specific characteristics of the printing apparatus. Therefore, once the tuned screen has been applied to the image/graphic printing for the specific printing apparatus, the ensured screen quality can be obtained.

As only one gamma function is required in the invention to perform the necessary adjustment in accordance with the characteristics of the printing apparatus, no additional adjustment of the gray levels in other stages of the printing process is required. It is especially helpful when the printing apparatus is not so complicated, then the designer does not have to add the calibration process in the software driver. Maybe the software driver even does not exist.

This method according to the invention can effectively simplify the calibration for the printing apparatus, and what's more does not require additional equipment to achieve nonlinear calibration. It advantageously constitutes an economical solution.

Further scope of applicability of the present invention will become apparent from the detailed description given hereinafter. However, it should be understood that the detail description and specific examples are given by way of illustration only. Since various changes and modifications within the spirit and scope of the invention will become apparent to those skilled in the art from this detailed description.

BRIEF DESCRIPTION OF THE DRAWINGS

The invention will be easily understood from the detailed description given in the illustration below, and does not intend to limit the invention:

FIG. 1 is a schematic view illustrating a AM screen spot growth order;

FIG. 2 is another schematic view illustrating a AM screen spot growth order;

Figure 3:
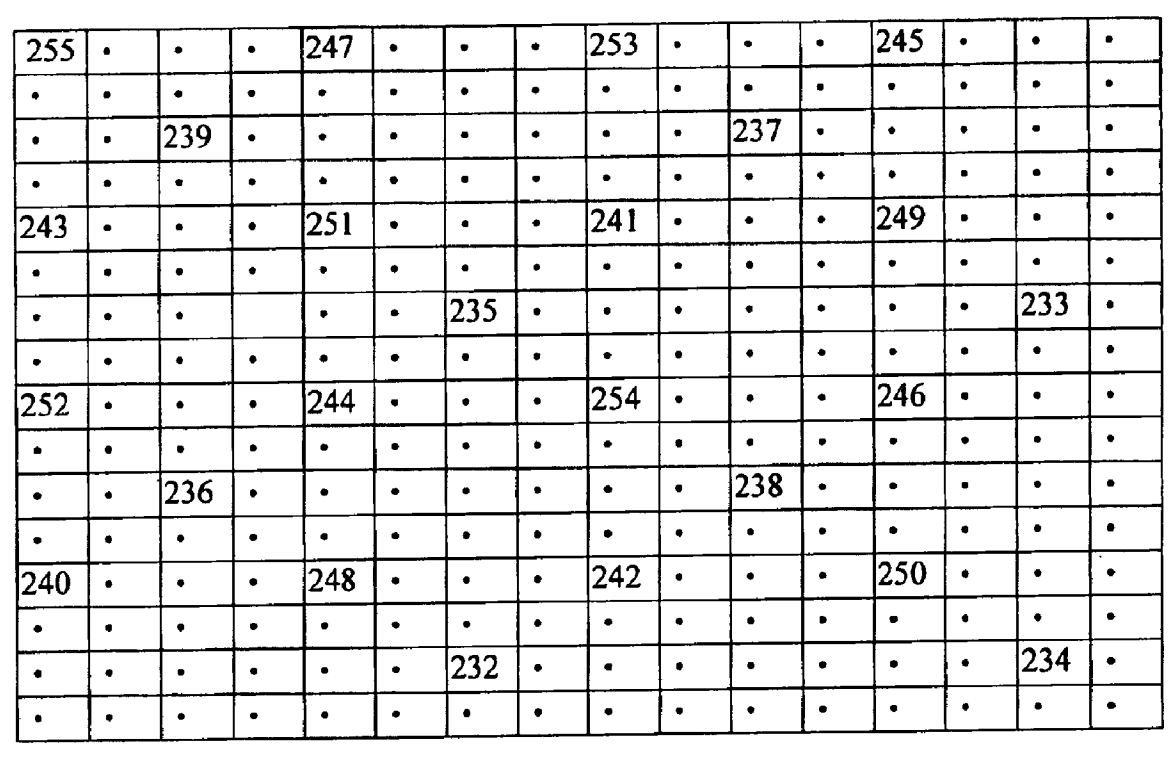

FIG. 3 is a schematic view illustrating a FM screen growth order;

FIG. 14 is the original halftone screen table before calibration;

FIG. 15 shows an image output without performing a nonlinear gamma function calibration according to an embodiment of the invention;

FIG. 16 illustrates a halftone screen table after the first nonlinear gamma function calibration has been applied according to an embodiment of the invention;

FIG. 17 shows an image output obtained from a halftone screen table calibrated with the first nonlinear gamma function according to an embodiment of the invention;

FIG. 18 illustrates a halftone screen table after the second nonlinear gamma function calibration has been applied according to an embodiment of the invention; and FIG. 19 shows an image output obtained by applying a halftone screen table calibrated with the second nonlinear gamma function according to an embodiment of the invention.

DETAILED DESCRIPTION OF THE INVENTION

Figure 4:
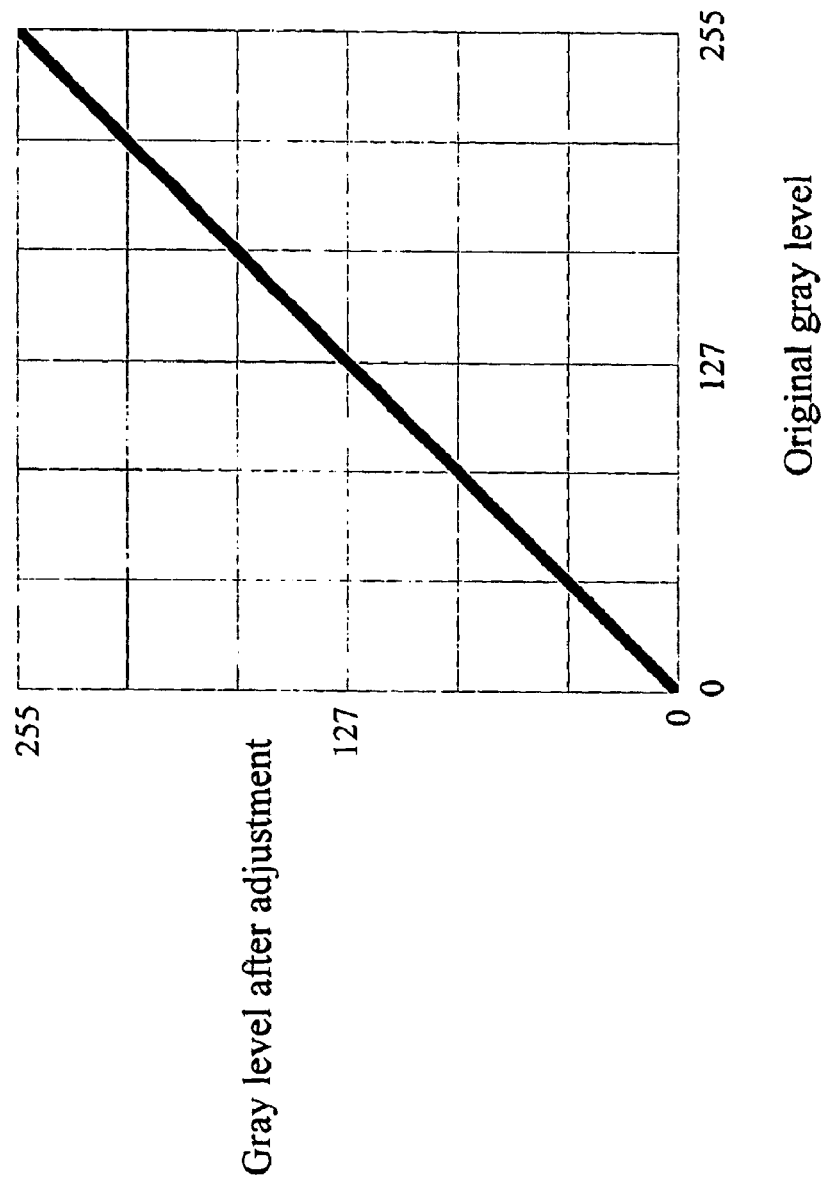
FIG. 4 shows the relation between the original gray level values and the new gray level values. Without any calibration, the slope equals 1.

According to the invention, a method of nonlinear calibration for halftone screen is implemented (but not limited) in a data printing process. The invention uses a nonlinear gamma function to adjust the original gray levels in the screen table. It can help to introduce quick and consistent screen data change. A typical application is to use the calibrated screen table to adjust the shadow area gray levels. In that case, some printer characteristics make the different gray levels in the shadow area look the same—too dark at all.

Referring to FIG. 14, we use cluster-dot-order approach to create the original halftone screen. Method addressing the screen creation is disclosed in, e.g. Holladay algorithm. This method is therefore free of the texture problem. In FIG. 14, the original gray level values (0–255) are linearly mapped to the new gray level values. In this case, the new gray level values are the same as the original gray level values.

As we know, the calibration compensation is mainly used to reduce the effect of printing apparatus dot gain. In order to eliminate the effect of dot gain, we may try to tune in the apparatus itself, such as the engine developing bias, drum charging voltage. Also we can adjust on software, such as the screen table tuning. There exist some factors that affect the result of screen tuning. For example, the color balanced elements (contrast, brightness, saturation, and color's strength), toner characteristics and the dot gain. We can hopefully put them together in the gamma function than we need to tune the screen only once. It means, during the entire printing process, only unique calibration in the halftone screen table is required, and no other calibrations are needed. Therefore, the processing steps required for color calibration in the printing process are advantageously simplified.

The invention is described by some mathematical function and we sum them up in one formula which we call gamma function. The gamma function is used to normalize the gradation of the screens. By using this gamma function, it will increase the visible detail in the shadow and highlight area, and even bring better result for the mid-tones area.

While tuning, the selected target file has to be printed first. By using the optic density meter or other optic measurement apparatus, we are aware of the printout color quality. According to the measured optic density or observation visually, the color engineer can adopt next step to continue the tuning process.

During the iterative tuning process, color engineer can apply different values for the parameters in the given gamma function. The gamma function is used to adjust the original gray levels. In the following gamma function, the "x" stands for the original gray level and "F(x)" stands for the calibrated new gray level. According to the invention, the expression of the gamma function is described as following:

$$F(x)=\min\{\max[(x+(x^{p\_val}/div\_val)-\text{shift})*\exp(e\_val)*\log(l\_val), 0], u\_bound\},$$

Where:

p_val: is a power value that will affect the flexion of the curve div_val: is a divisor that will affect contrast.

shift: is a shift value that will affect the brightness;

e_val: is an exponent value that will affect the flexion of the curve l_val: is a logarithm parameter that will affect the flexion of the curve u_bound : is a dot gray level upper bound where dot will be turn on.

One embodiment of the invention is as following:

$$F(x)=\min\{\max[(x+x^{1.1}/10-42)*\exp(0)*\log(10), 0], 249\}$$

Then, we get the full set of tuned gray level. Those gray levels will be used to print the target file. With the target file printout, we do the optic density measurement again. Depending on the tuned quality, it determines whether the nonlinear calibration will continue. If yes, we will repeat the process until the acceptable quality has been achieved.

Figure 5:
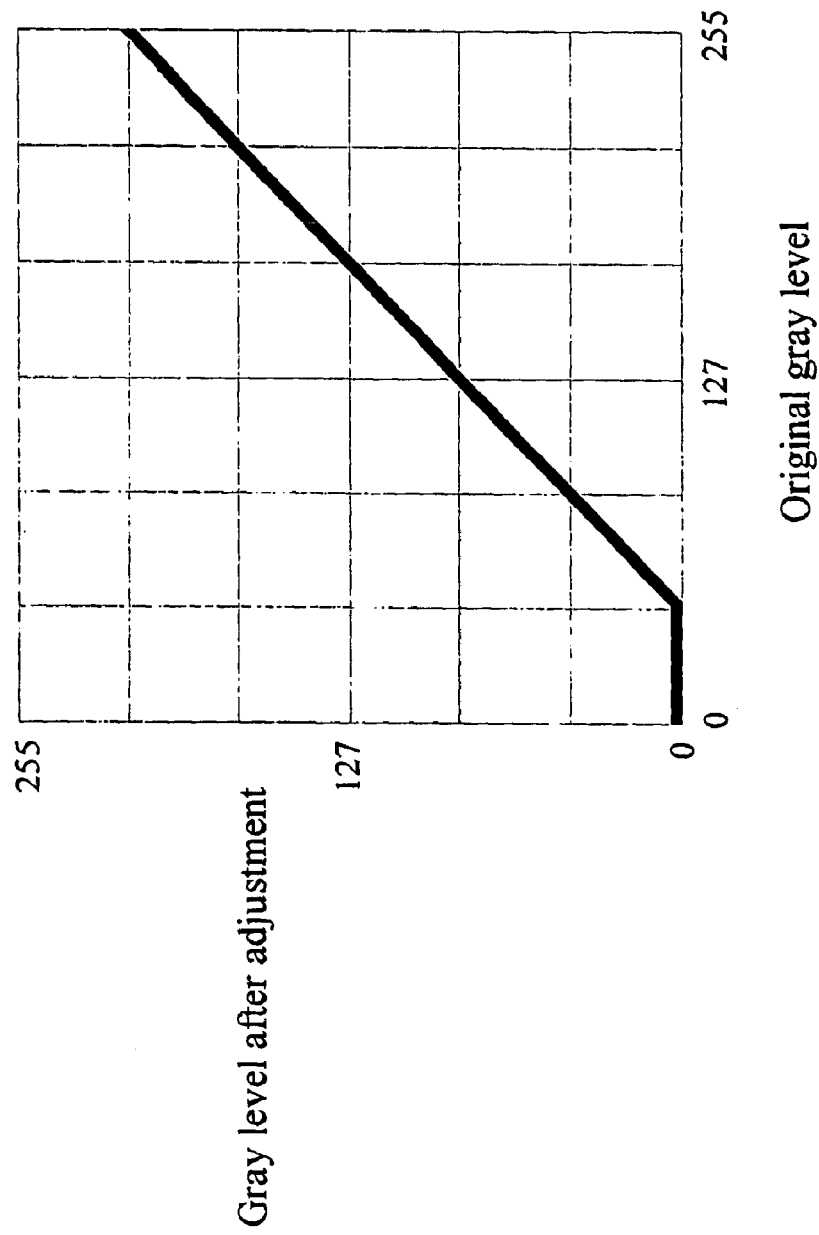
FIG. 5 shows the relation between the original gray level values and the new gray level values. By using the linear (brightness) adjustment, all the updated gray levels are higher than before. The slope remains unchanged, but the whole histogram shifts to right slightly, it also results in the loss of some high gray levels.
Figure 6:
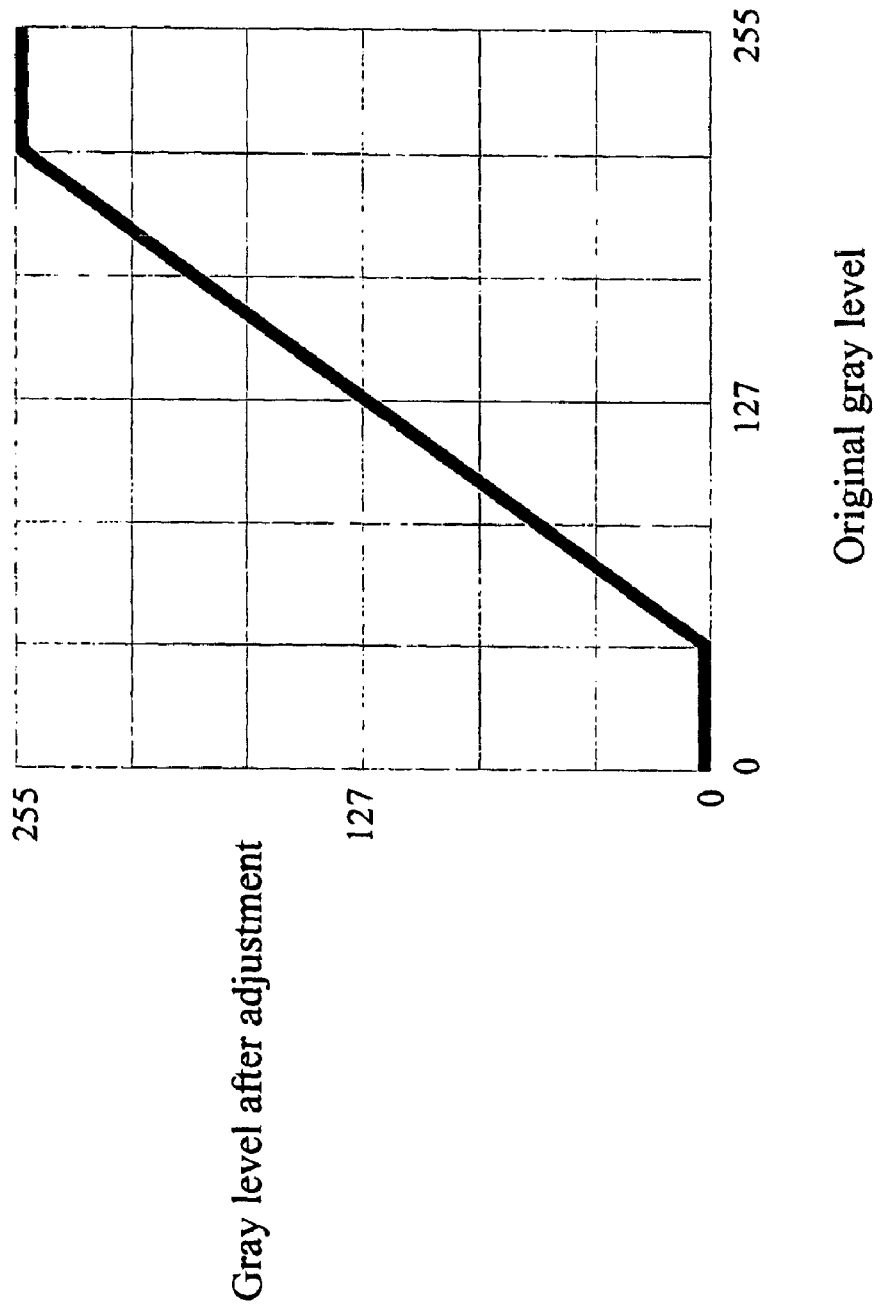
FIG. 6 shows the relation between the original gray level values and the new gray level values, where the new gray level values are computed by multiplying the original gray level with some ratios higher than one. This will result in the contrast adjustment for the original gray levels.
Figure 7:
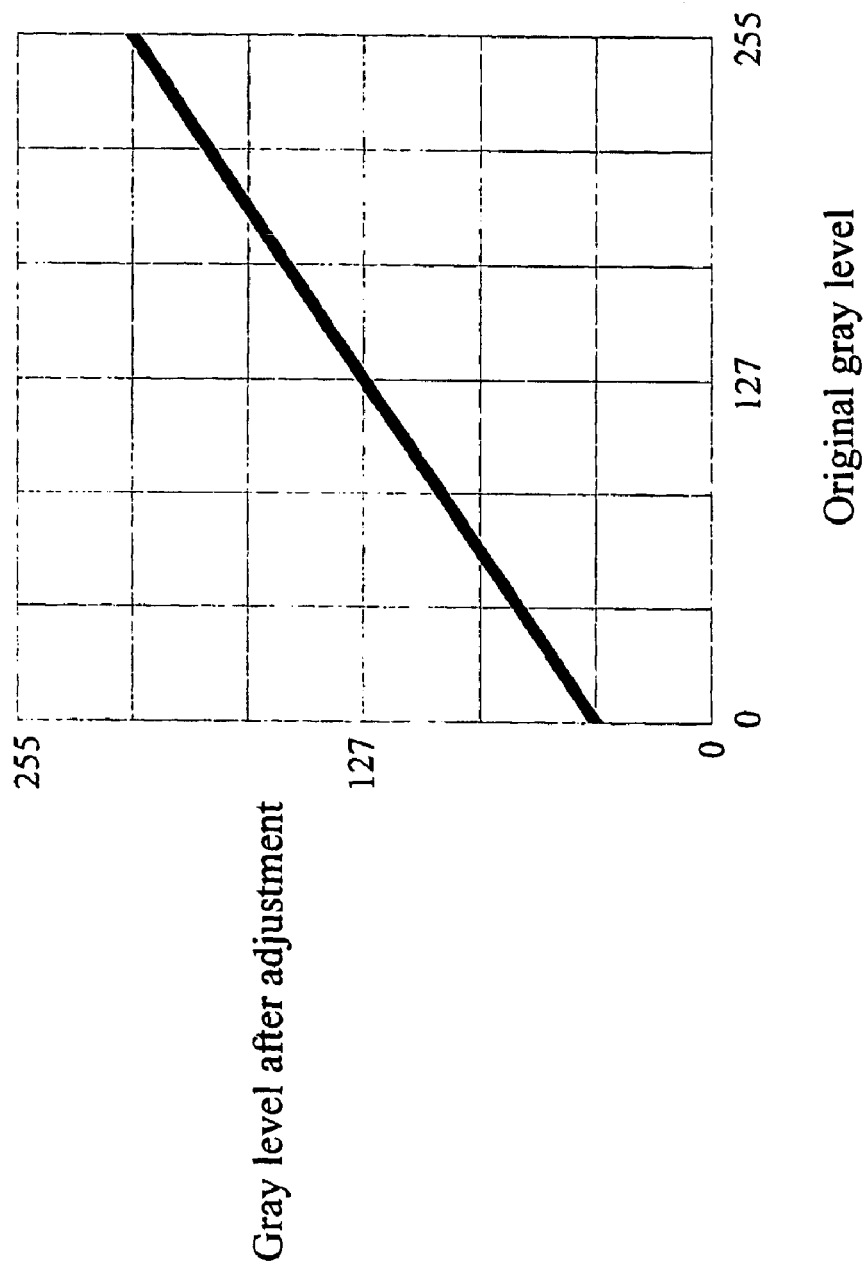
FIG. 7 functions the same as FIG. 6, except that the multiplier ratio is smaller than one. That will result in a flatter gray level change.

FIG. 4 shows the relation between the original gray level values and the new gray level values. Without any calibration, the slope equals 1. As shown in FIG. 5, where we subtract a fixed number from the original gray level values, that is, the gray levels decrease the same amount. It is corresponding to the case where we set the "shift" value in above gamma function. This is a linear adjustment and it will affect the brightness of the final image. Depending on the application design, the result image may become brighter or darker. As shown in FIG. 6 and FIG. 7, when we multiply/divide a fixed number from the given level value, then the original gray level values get a contrast adjustment. This is a linear adjustment as well.

FIG. 8, 9, 10, 11 and 12 reveal the non-linear calibration functions. Herein

Figure 8:
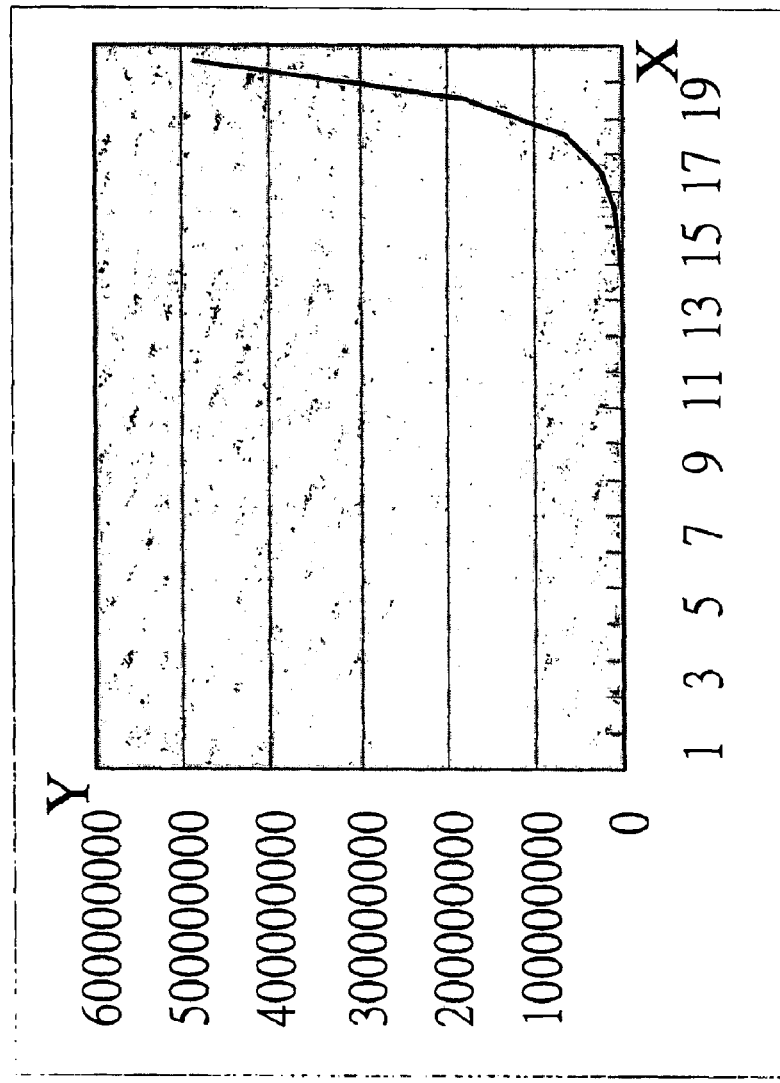
FIG. 8 is a functional diagram of $Y=e^X$; it will help to construct the concept of nonlinear calibration. By using this exponential function, we may get the result new gray level change nonlinearly.

FIG. 8 is a functional diagram of $Y=e^X$; it will help to construct the concept of nonlinear calibration. By using this exponential function, we may get the result new gray level change nonlinearly.

Figure 9:
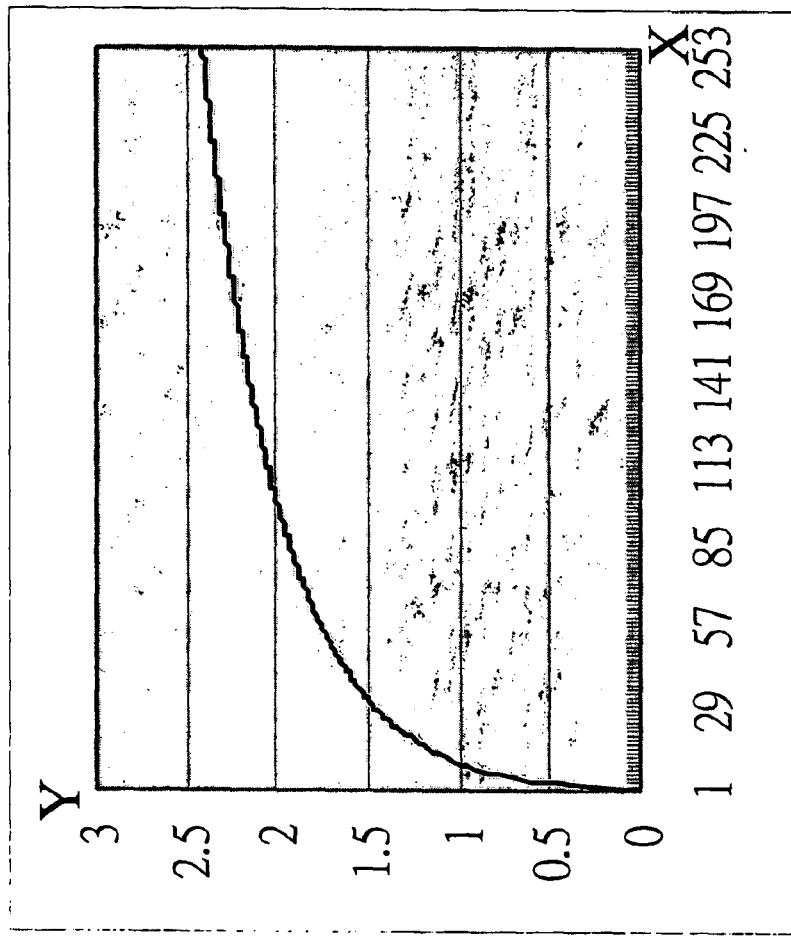
FIG. 9 is another function $Y=\log_{10}X$ which is used for nonlinear calibration.

FIG. 9 is another function $Y=\log_{10}X$ which is used for nonlinear calibration.

Figure 10:
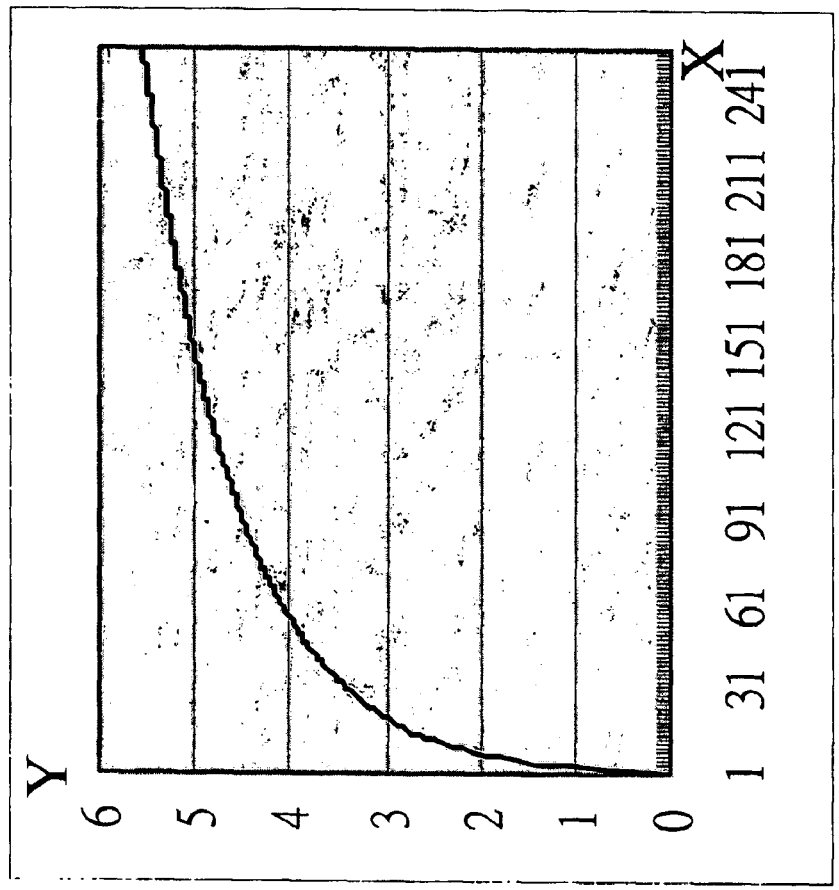
FIG. 10 is the $3^{rd}$ function $Y=\ln X$ which is used for nonlinear calibration.

FIG. 10 is the $3^{rd}$ function $Y=\ln X$ which is used for nonlinear calibration.

Figure 11:
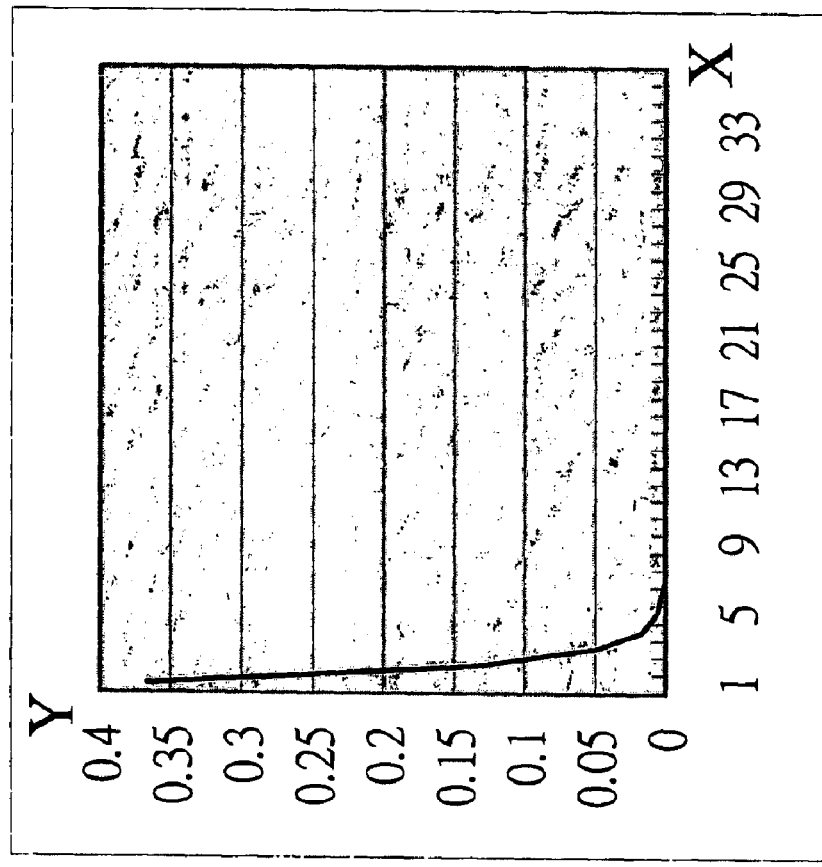
FIG. 11 is the $4^{th}$ function $Y=e^{-X}$ which is used for nonlinear calibration.

FIG. 11 is the $4^{th}$ function $Y=e^{-X}$ which is used for nonlinear calibration.

Figure 12:
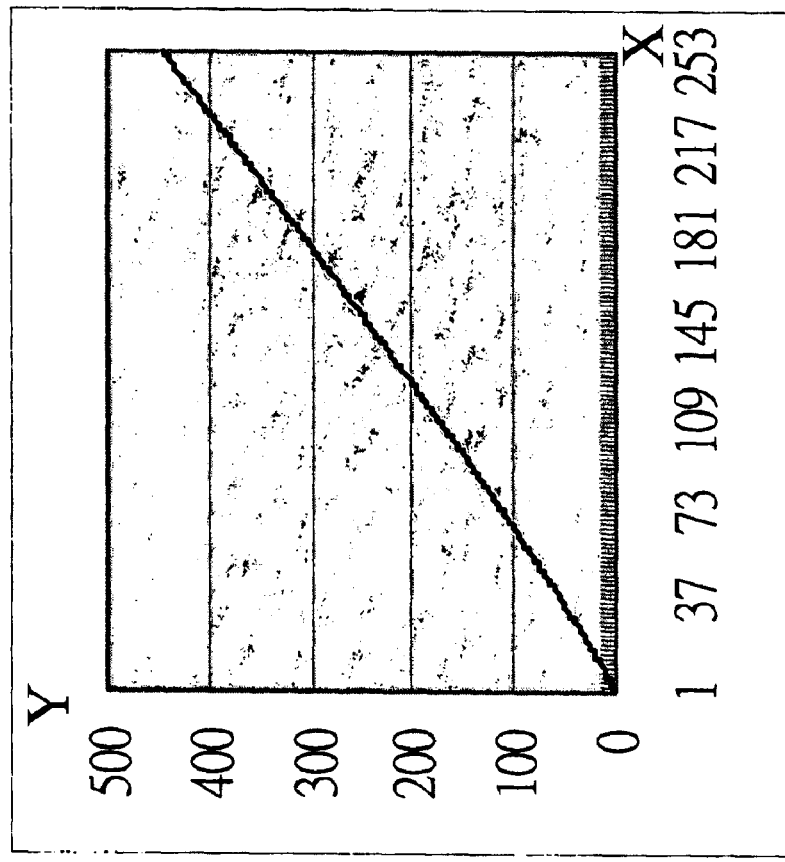
FIG. 12 is a sample function $Y=X^{1.1}$ which is used for nonlinear calibration.

FIG. 12 is a sample function $Y=X^{1.1}$ which is used for nonlinear calibration.

Figure 13:
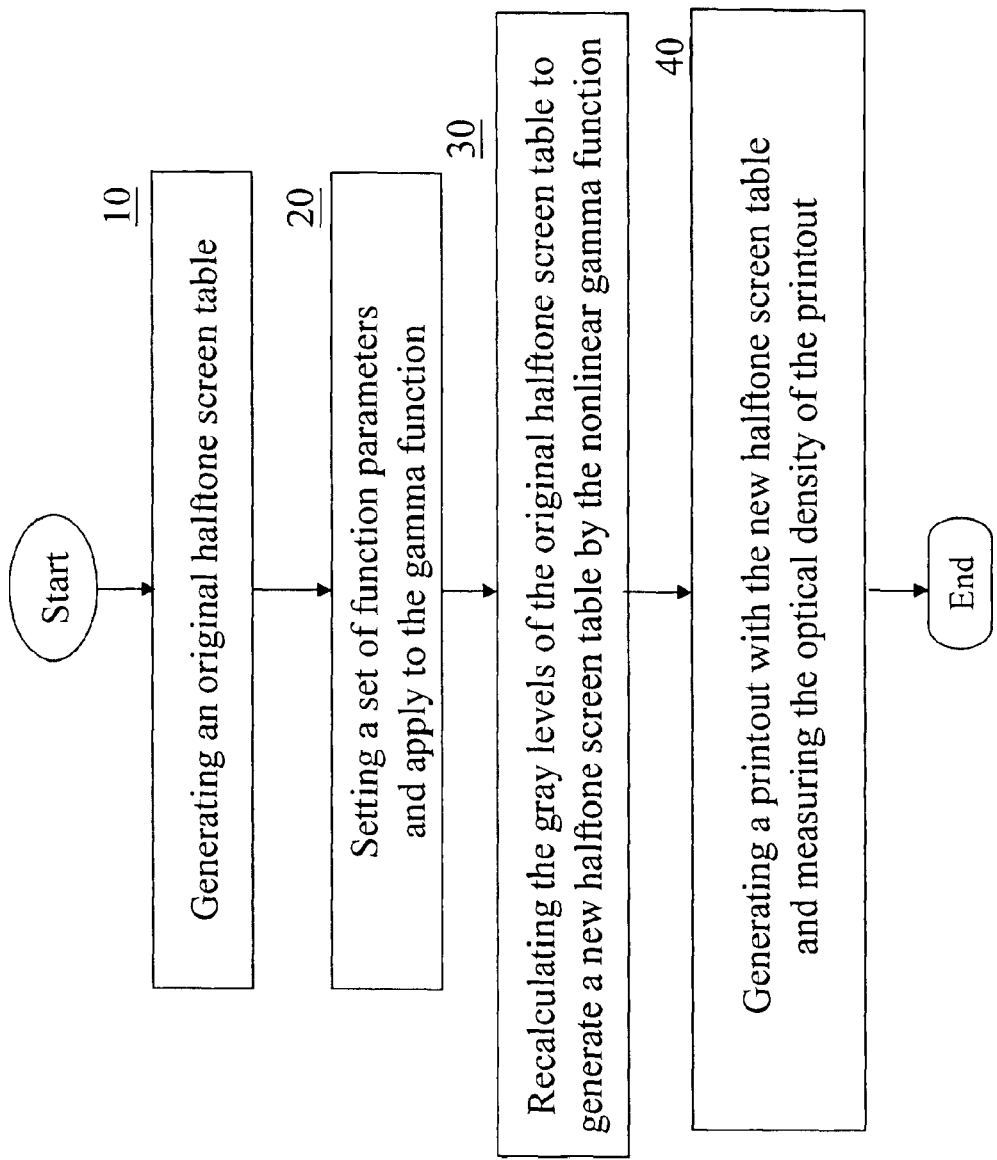
FIG. 13 is a flow chart illustrating a method of nonlinear calibration of halftone screen table according to an embodiment of the invention.

Referring to FIG. 13, a flowchart schematically illustrates the process of nonlinear calibration for this invention, particularly implemented in the printing apparatus. The method of nonlinear calibration is implemented for the printing apparatus to calibrate the gray levels of the halftone screen table and, thereby, improves the rendering characteristics of the image printout.

Figure 15:
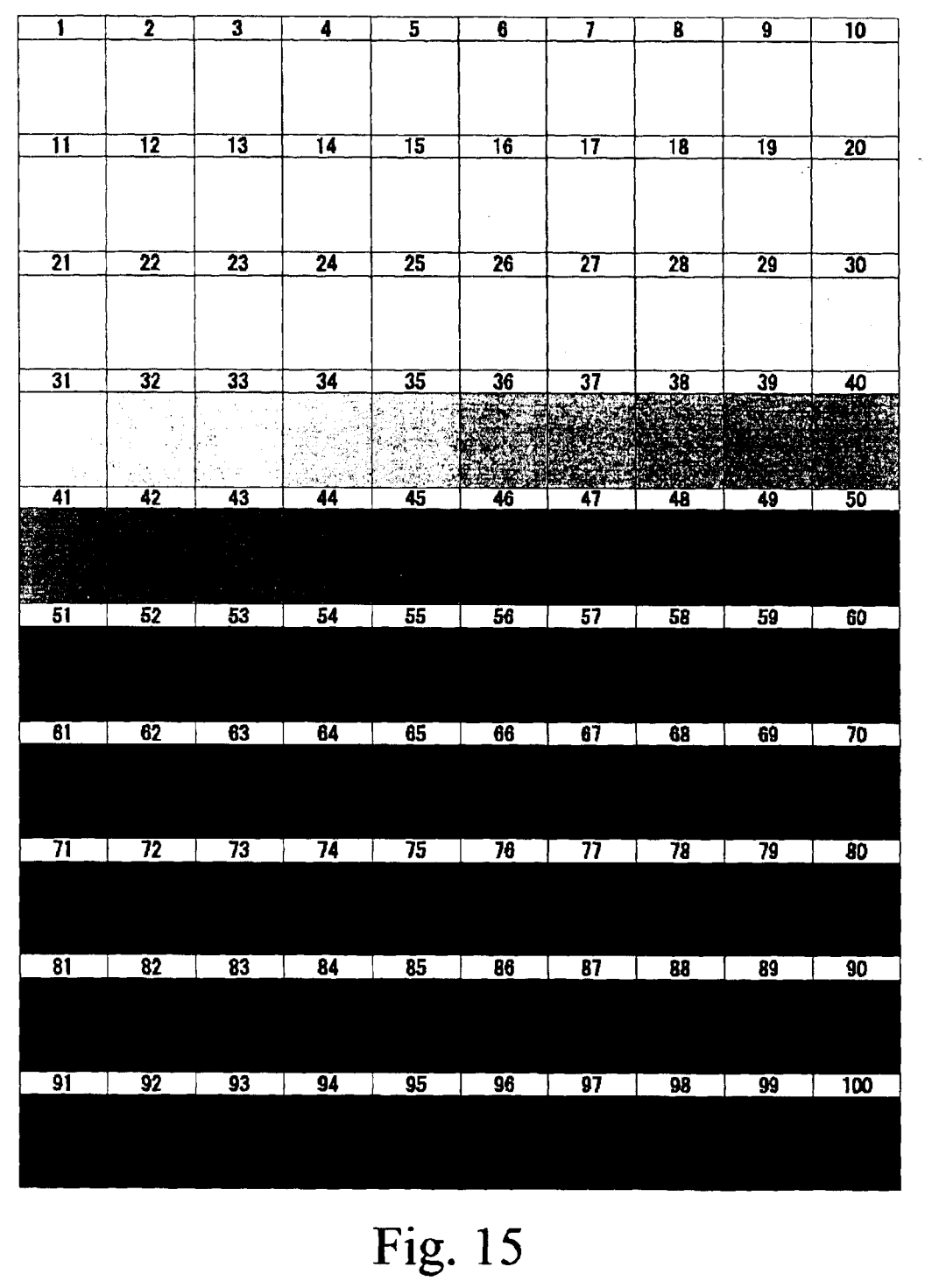

First, generating an original halftone screen table (step 10). A target image (as shown in FIG. 15) is printed out from the printing apparatus to be calibrated. It is based on its original halftone screen table (as shown in FIG. 14). As shown in FIG. 15, in the printed image, the $4^{th}$ and $5^{th}$ grids in the highlight area have excessively whitened colors. Also the $86^{th}$ to $100^{th}$ grids in the shadow area have excessively dark/deep color which makes the distinction between lighter and darker black impossible.

From the printout quality, the further calibration for the screen table is necessary. Look at the printout, the brightness and contrast are not good enough. Besides, we need some nonlinear curve to tune the color density. Summarizing the above, we set a set of function parameters and apply to the gamma function (step 20). It is the time to create a nonlinear gamma function according to the set of parameter.

Then, recalculating the gray levels of the original halftone screen table to generate a new halftone screen table by the gamma function (step 30). FIG. 16 illustrates a new halftone screen table obtained by calibrating the original gray levels shown in FIG. 14. We can do this via applying a nonlinear gamma function in Microsoft software Excel™ as follows:

MIN (ROUNDDOWN (MAX (x+POWER(x, 1.1)/10-20,0), 0), 249);

Wherein:

MIN is the minimal operator. The calibrated gray level will not be higher than 249;

ROUNDDOWN is a round down operator. We need an integer gray level

MAX is the maximal operator. The calibrated gray level will not be lower than 0;

x is a variable representing original gray level of the halftone screen table.

POWER is an exponent operator. It is used for the nonlinear curve.

Figure 17:
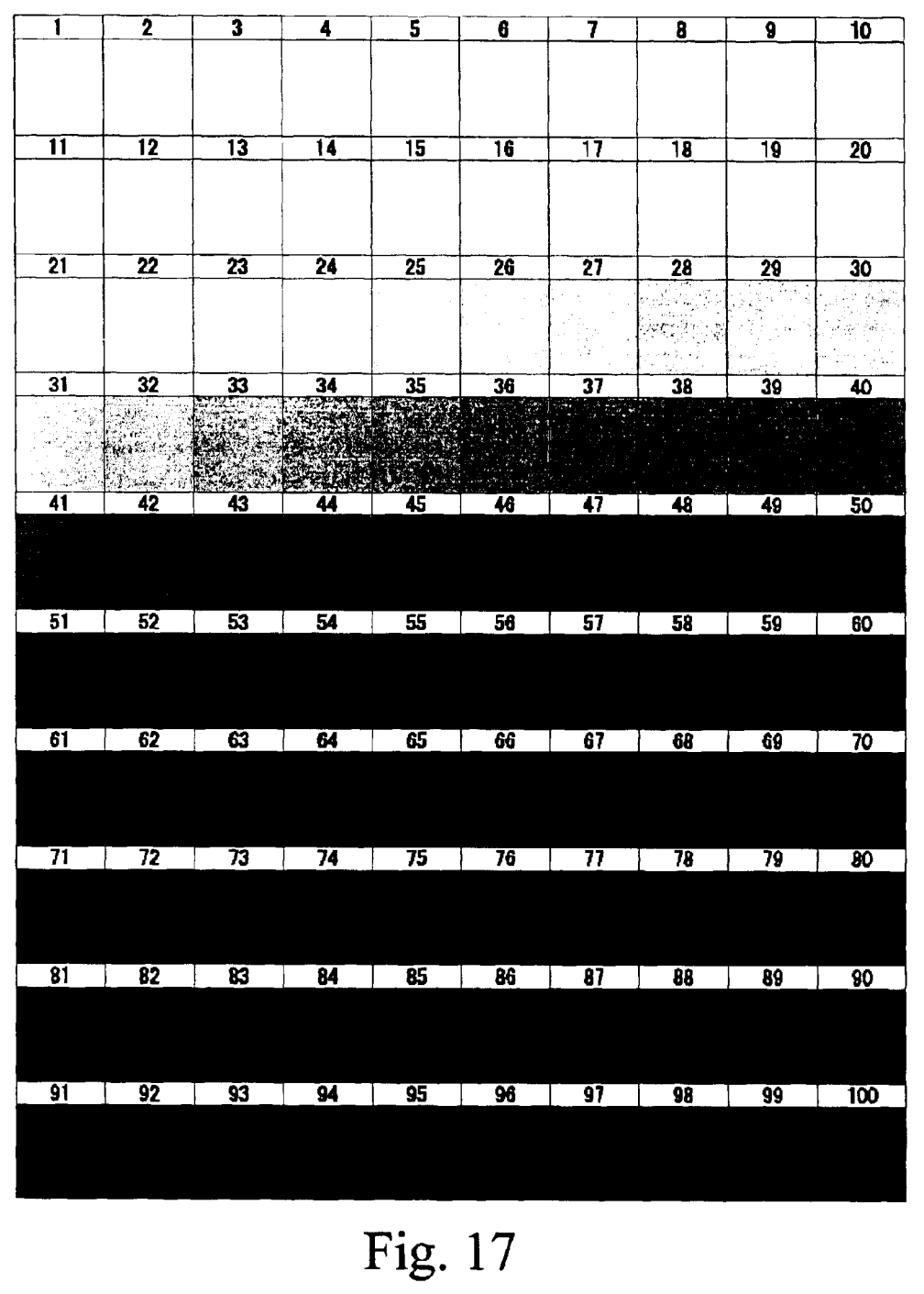

Finally, generating a printout with the new halftone screen table and measuring the optical density of the printout (step 40). FIG. 17 illustrates the printout obtained from the first calibrated halftone screen table. As shown, the colors of the entire image are blackened.

Therefore, the user need to go back to step 20 to set new function parameters and apply new nonlinear gamma function to re-calibrate the gray levels of the halftone screen table. The process will repeat until the image has acceptable quality.

FIG. 18 is another halftone screen table, calibrated with a second nonlinear gamma function, which is implemented under Excel™ as follows:

MIN (ROUNDDOWN (MAX (x+POWER(x, 1.1)/10-42, 0), 0), 249).

Figure 19:
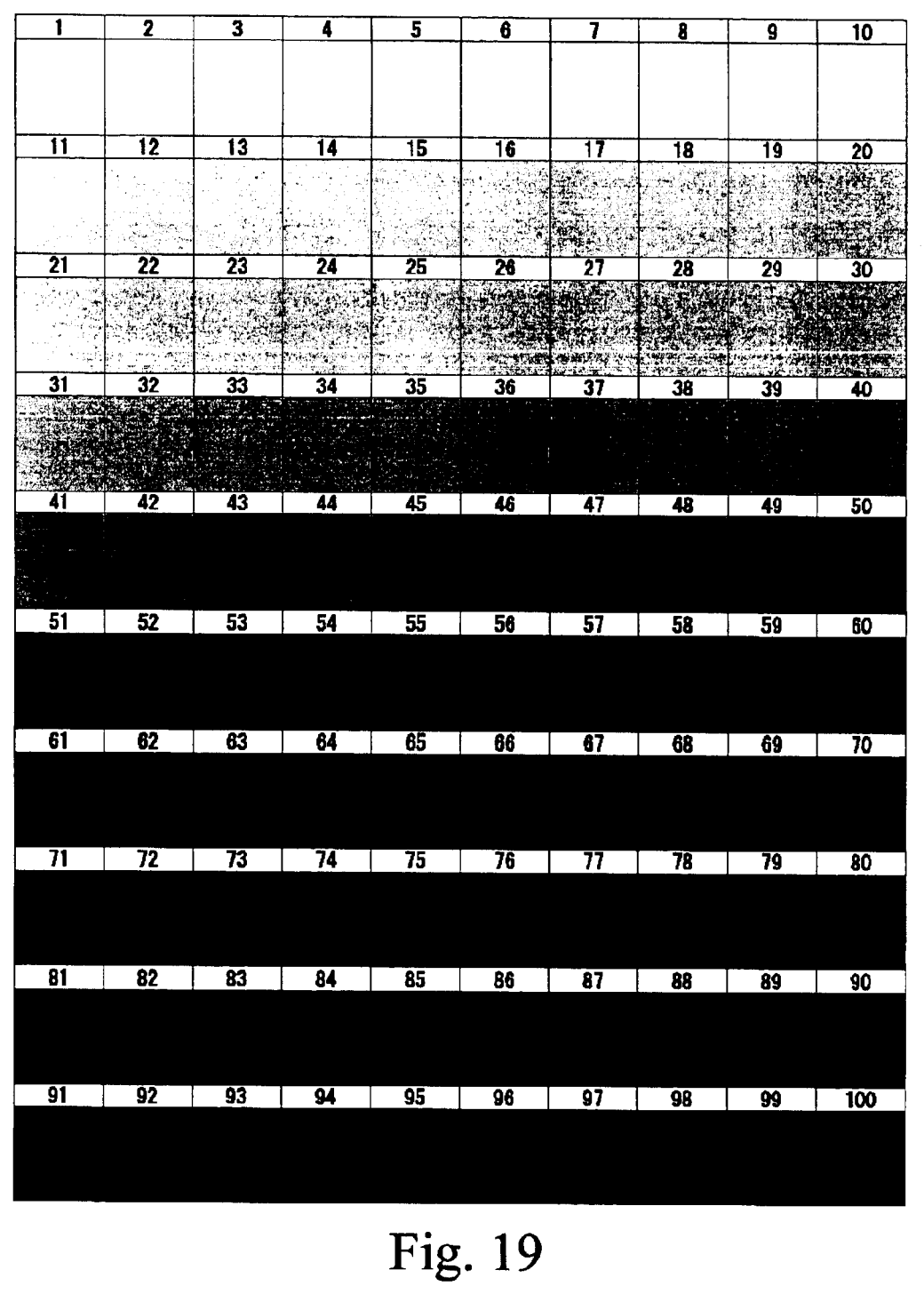

FIG. 19 illustrates the printout obtained from a calibrated halftone screen table. As shown, all the shadow or highlight areas have very distinct color gradations. To compare with FIG. 15 and FIG. 17, it constitutes a substantial improvement.

As mentioned in the above paragraph, the method of the invention is not limited for use in monochrome printing apparatus, but is also suitable for use in color printing apparatus. For color printing apparatus, the calibrations have to be applied on CMYK four colors individually.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A method of nonlinear calibration of halftone screen, comprising:

(a) generating an original halftone screen table;
    (b) setting a plurality of function parameters and apply to a gamma function;
    (c) recalculating the gray levels of the original halftone screen table to generate a new halftone screen table by the gamma function; and
    (d) generating a printout with the new halftone screen table and measuring the optical density of the printout;
    wherein the original halftone screen table is a cluster-dot-order (AM) half tone screen table.

2. The method of nonlinear calibration of halftone screen of claim 1, wherein the function parameters are for printer apparatus.

3. The method of nonlinear calibration of halftone screen of claim 1, wherein the function parameters are for mono mode printing apparatus halftone screen table tuning.

* * * * *